(12) United States Patent
Herntier et al.

(10) Patent No.: US 8,708,403 B2
(45) Date of Patent: Apr. 29, 2014

(54) FRONT-SECTION STRUCTURE OF A MOTOR VEHICLE

(71) Applicant: Dr. Ing. h.c.F. Porsche Aktiengesellschaft, Stuttgart (DE)

(72) Inventors: Matthias Herntier, Friolzheim (DE); Rainer Joest, Vaihingen/Enz (DE); Gernot Jenisch, Wimsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/711,684

(22) Filed: Dec. 12, 2012

(65) Prior Publication Data

US 2013/0161978 A1 Jun. 27, 2013

(30) Foreign Application Priority Data

Dec. 21, 2011 (DE) .......................... 10 2011 056 737

(51) Int. Cl.
*B60N 99/00* (2006.01)

(52) U.S. Cl.
USPC .................. 296/193.09; 296/203.02; 280/781

(58) Field of Classification Search
USPC .................. 296/193.06, 193.09, 203.02, 192,
296/187.09, 187.1, 187.12, 193.05, 203.03,
296/198, 30, 187.08, 193.07; 180/89.1;
280/124.109, 788, 781, 287, 124.147,
280/124.15
See application file for complete search history.

(56) References Cited

U.S. PATENT DOCUMENTS

| | | | | |
|---|---|---|---|---|
| 3,625,561 A * | 12/1971 | Huber | | 296/187.09 |
| 6,135,498 A | 10/2000 | Vlahovic | | |
| 6,193,273 B1 | 2/2001 | Novak et al. | | |
| 6,209,950 B1 * | 4/2001 | Hanyu | | 296/203.02 |
| 6,773,057 B2 * | 8/2004 | Nomura | | 296/198 |
| 7,204,545 B2 | 4/2007 | Roux et al. | | |
| 7,559,402 B2 | 7/2009 | Jennings et al. | | |
| 7,770,964 B2 * | 8/2010 | Herntier et al. | | 296/193.01 |
| 7,905,503 B2 * | 3/2011 | Goto et al. | | 280/124.109 |
| 2002/0008408 A1 * | 1/2002 | Tilsner et al. | | 296/194 |
| 2005/0046237 A1 * | 3/2005 | Miyoshi et al. | | 296/203.02 |
| 2006/0103163 A1 * | 5/2006 | Rech-Linker et al. | | 296/96.15 |
| 2007/0200391 A1 | 8/2007 | Thoms | | |
| 2008/0079290 A1 | 4/2008 | Li et al. | | |
| 2008/0122146 A1 * | 5/2008 | Herntier et al. | | 267/2 |

FOREIGN PATENT DOCUMENTS

| | | |
|---|---|---|
| DE | 196 00 460 | 7/1997 |
| DE | 196 30 647 | 2/1998 |
| DE | 198 08 392 | 3/1999 |
| DE | 102 27 635 | 1/2004 |
| DE | 103 51 137 | 2/2005 |
| DE | 603 12 863 | 1/2008 |
| DE | 60 2004 008 372 | 5/2008 |

OTHER PUBLICATIONS

German Search Report of Aug. 16, 2012.

* cited by examiner

*Primary Examiner* — Lori Lyjak
(74) *Attorney, Agent, or Firm* — Gerald E. Hespos; Michael J. Porco; Matthew T. Hespos

(57) ABSTRACT

For the reinforcement of a front section of a motor vehicle, a transverse beam is arranged between longitudinal beams of the body structure at the front side. The transverse beam is situated above the longitudinal beams and is adjoined by in each case one lattice girder. Each lattice girder extends in the longitudinal direction of the longitudinal beams and is connected at one side to the transverse beam and at the other side to a suspension unit mount.

10 Claims, 3 Drawing Sheets

FRONT-SECTION STRUCTURE OF A MOTOR VEHICLE

CROSS REFERENCE TO RELATED APPLICATION

This application claims priority under 35 USC 119 to German Patent Appl. No. 10 2011 056 737.2 filed on Dec. 21, 2011, the entire disclosure of which is incorporated herein by reference.

BACKGROUND OF THE INVENTION

1. Field of the Invention

The invention relates to a front-section structure of a motor vehicle.

2. Description of the Related Art

US 2008/0079290 A1 discloses a front section of a motor vehicle having a transversely situated frame part that is adjoined to the longitudinal sides of the vehicle by a structural element. The structural element is aligned vertically and comprises a lattice of vertical and horizontal webs that are connected to one another. DE 60 2004 008 372 T2 discloses a fender carrier for a motor vehicle. The fender carrier has ribs and webs that form an energy-absorbing structure.

It is an object of the invention to provide a front section for a motor vehicle. The front section should be connected to a reinforcement structure that acts in the longitudinal, transverse and vertical directions, and that has a suspension unit mount integrated therein.

SUMMARY OF THE INVENTION

The invention provides a front-end transverse beam and an adjoining lattice-like longitudinal beam that includes a suspension unit mount and that creates a front reinforcement structure in the front section. More particularly, a transverse beam is connected the front free ends of the longitudinal beams of the vehicle and is situated above the longitudinal beams. Lattice girders extend in the longitudinal direction of the longitudinal beams and are connected at one side to the transverse beam and at the other side to the suspension unit mount. The transverse beam connected to the lattice-like longitudinal beams and the suspension unit mounts provides a stable strength bond of the front section of the vehicle.

The transverse beam preferably comprises a transverse bar and two vertical transverse struts that are arranged below. The transverse struts extend at an angle from a vehicle longitudinal central axis to the longitudinal beams and are connected to vertical pillars that are fastened to the transverse bar of the transverse beam. The transverse struts provide additional stiffening of the transverse bar and significantly increase the transverse stability of the front section.

The lattice girder preferably is arranged in an approximately horizontal oblique plane between the bracket of the suspension unit mount and the transverse beam. The lattice girder preferably comprises two outer struts that diverge toward the bracket of the suspension unit mount and that have inner struts inclined at an angle with respect to the outer struts. An end-side inner strut runs from an outer strut to the transverse beam and is connected to the transverse beam, or the outer strut is connected directly to the transverse beam. The outer struts of the lattice girder preferably are screwed to the bracket of the suspension unit mount. The struts may be aluminum, CFRP or plastic.

The bracket for the suspension mount comprises two substantially vertical support arms. The suspension unit mount is arranged between the vertical support arms in a support plate, and the front support arm, as viewed in the direction of travel, is connected to the lattice girder. A support rod is connected to the support plate of each suspension unit mount and is inclined at an angle. A free end of the support rod is fastened to a cowl frame reinforcement. The support rods are connected to one another in a reinforcing manner by parallel transverse beams that have interposed webs.

A lattice-like suspension dome brace preferably is connected to the support plate by a circular plate, and the suspension dome brace is held with an opposite free end on the vehicle body. The arrangement of the suspension unit mount between the lattice girder and the suspension dome brace and the presence of the support rod achieve a stable arrangement of the suspension unit mount, and also reinforces the front section.

The longitudinal beams of the front section are provided with a fork at rear ends as viewed in the direction of travel. An upper longitudinal beam portion of the fork is connected to a bulkhead of the vehicle and a lower longitudinal beam portion of the fork is connected to an underfloor of the vehicle body. The fork of the ends of the longitudinal beam distribute forces to the bulkhead transverse beam of the vehicle.

DETAILED DESCRIPTION OF THE PREFERRED EMBODIMENTS

Figure 1:
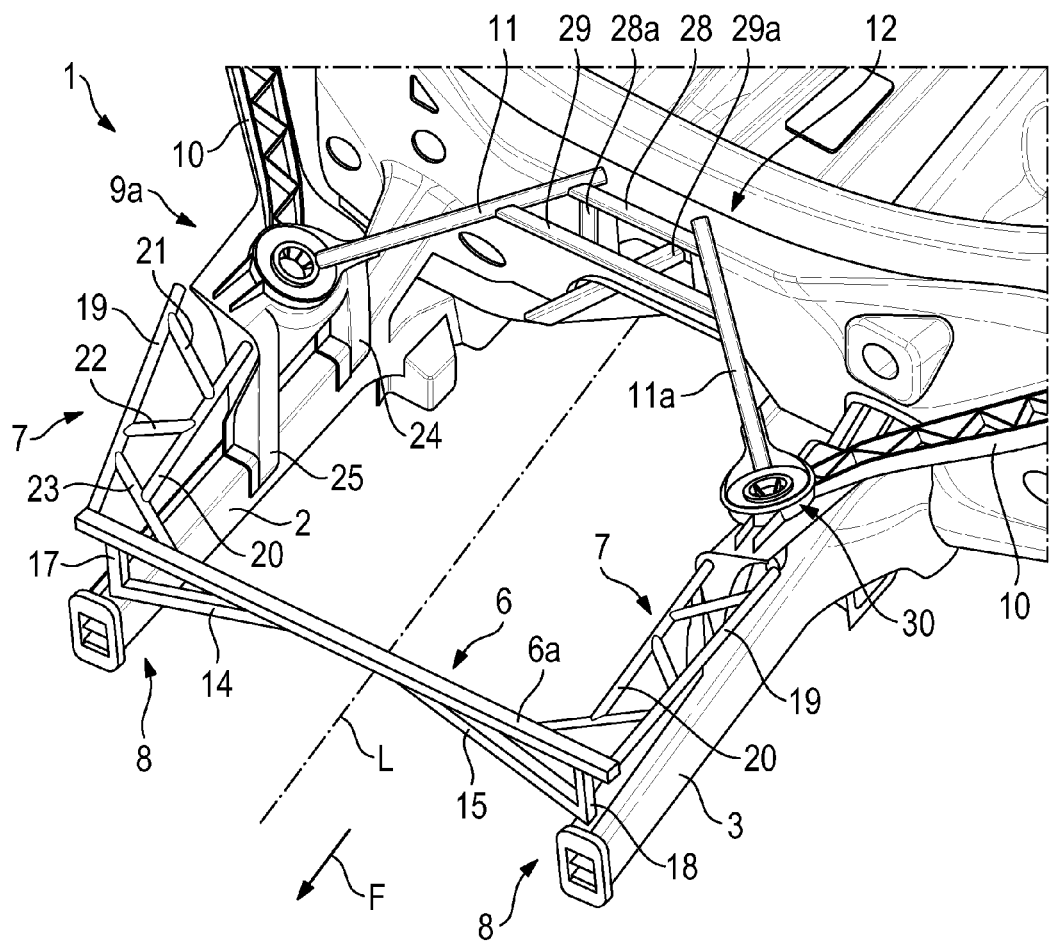
FIG. 1 is a diagrammatic view from above of a front section of a motor vehicle having reinforcement structures and a suspension unit mount.

A front-section structure 1 of a motor vehicle comprises two longitudinal beams 2, 3 that are connected to a bulkhead 4 and to an underfloor 5 of the vehicle body. A transverse beam 6 is connected to the front free ends of the longitudinal beams 2, 3 of the vehicle and is arranged above the longitudinal beams 2, 3. Lattice girders 7 extend in the vehicle longitudinal direction at a distance from the longitudinal beams 2, 3. Each lattice girder 7 has a front end 8, as viewed in the direction of travel F, connected with the transverse beam 6 and a rear end connected to a suspension unit mount 9. One end of the suspension unit mount 9 on each vehicle side is supported on a suspension dome brace 10 and on a support rod 11, 11a. The support rods 11, 11a extend from the suspension unit mount 9 in the direction of the bulkhead 4 or a cowl frame 12 of the vehicle body and support the suspension unit mount 9.

The transverse beam 6 comprises a transverse bar 6a and two transverse struts 14, 15. The transverse struts 14, 15 are below the transverse bar 6a and extend at an angle from the vehicle longitudinal central axis L to the longitudinal beams 2, 3 and are fastened to the longitudinal beams 2. The transverse bar 6a is connected to the transverse beams 2, 3 via vertical pillars 17, 18 that are supported on the transverse struts 14, 15.

The lattice girders 7 extend obliquely between the suspension unit mount 9 and the transverse beam 6 in an approximately horizontal plane above the longitudinal beam 2, 3.

Figure 2:
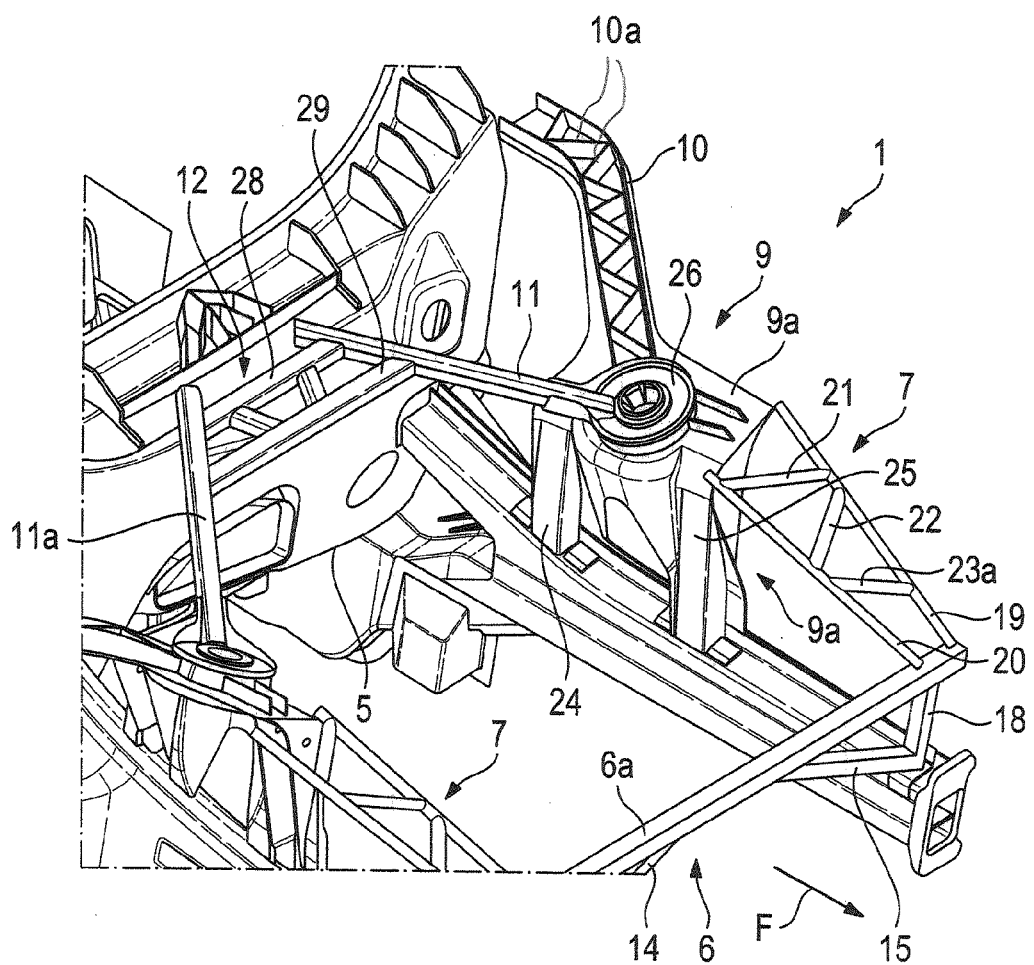
FIG. 2 is an enlarged illustration of the front section having the reinforcement structures, and an illustration of the connection of the suspension unit dome between the reinforcement structures.

Each lattice girder 7 extends between two outer struts 19, 20 that diverge toward the bracket 9a of the suspension unit mount 9. Inner struts 21, 22, 23 or 23a are arranged between the outer struts 19, 20 of each lattice girder 7 and are inclined at an angle. The end-side inner strut 23a may extend from the outer strut 19 to the transverse bar 6a of the transverse beam 6 and may have an end connected to the transverse bar 6a, as shown in more detail in FIG. 1. In a further possible embodiment, the ends of the outer struts 19, 20 are connected directly to the transverse bar 6a and the end-side inner strut 23a is arranged between the outer struts 19, 20, as shown in more detail in FIG. 2.

The bracket 9a for each suspension unit mount 9 has two vertical support arms 24, 25 and the suspension unit mount 9 is arranged in a support plate 26 between the support arms 24, 25. The lattice girder 7 is connected, for example, by a screw connection to the support arm 25, which is situated at the front as viewed in the direction of travel F. Feet A of the support arms 24, 25 are fastened to the longitudinal beam 2, 3.

Horizontal support rods 11, 11a are connected to the support plates 26 of the suspension unit mounts 9 at each side of the vehicle and are oriented at an angle with to the vehicle longitudinal central axis L. Free ends of the support rods 11, 11a are fastened to the cowl frame 12. The support rods 11, 11a also are connected in a reinforcing manner by at least two parallel transverse bars 28, 29. Struts 28a, 29a are arranged between the two transverse bars 28, 29 and are inclined at an angle.

Each suspension dome brace 10 is connected to the support plate 26 by a circular plate 30. The opposite free ends of each suspension dome brace 10 is held on the vehicle body. The suspension dome brace 10 preferably is formed with a lattice structure composed of webs 10a arranged in zig-zag configuration between the inner and outer walls of the suspension dome brace 10.

Figure 3:
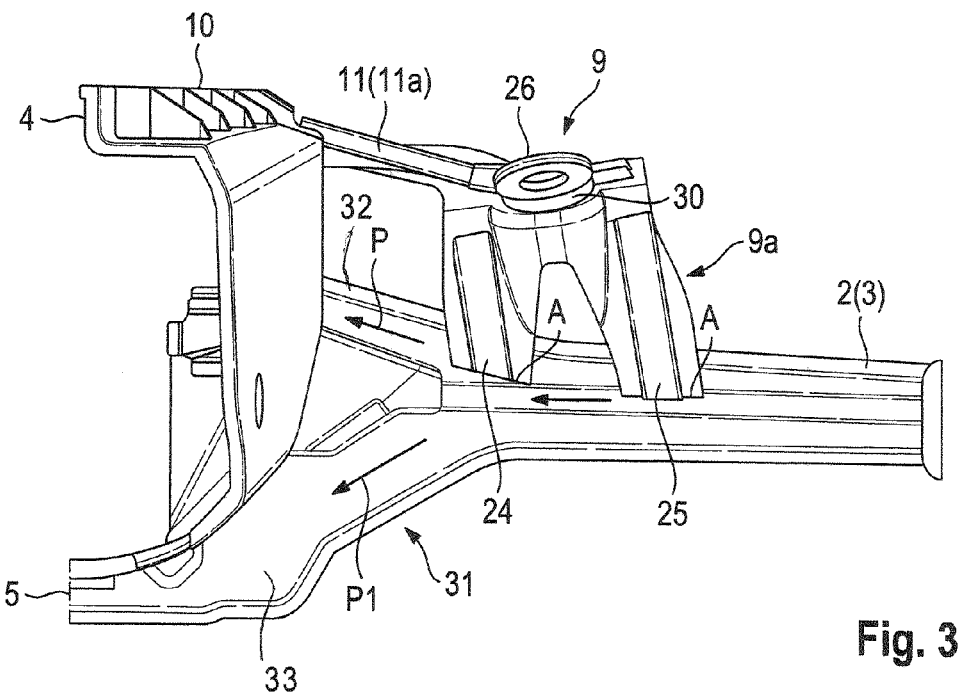
FIG. 3 is a view of a forked longitudinal beam of the vehicle with connected suspension unit dome.
Figure 4:
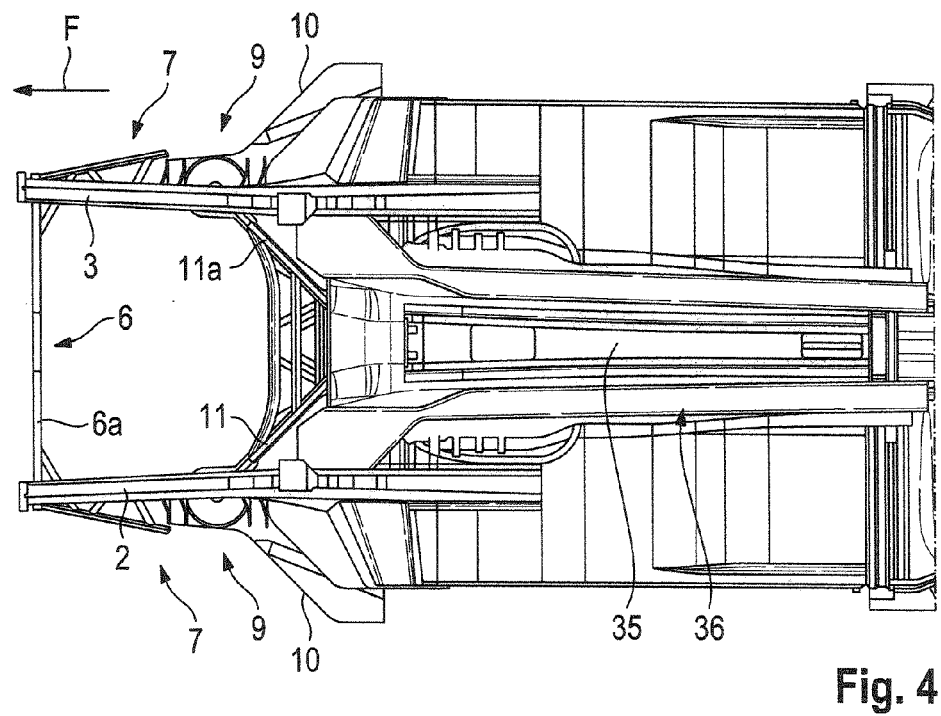
FIG. 4 is a view from below of the front section of the vehicle having reinforcement structures and a central tunnel reinforcement.

The support arms 24, 25 of the bracket 9a of the suspension unit mount 9 are connected via the feet A directly to the longitudinal beams 2, 3. The longitudinal beams 2, 3 have a fork 31 at the rear as viewed in the direction of travel F. An upper longitudinal beam portion 32 of the fork 31 is connected to the bulkhead 4 of the vehicle, and a lower longitudinal beam portion 33 of the fork 31 is connected to the underfloor 5 of the vehicle body, such that a distribution of forces is realized by the fork 31 of the longitudinal beams 2, 3, as shown in FIG. 3 by the arrows P and P1. A lateral continuous profile element 36 is provided on the underfloor 5 and is arranged on the lower edge of the tunnel to adjoin the longitudinal beams 2, 3. The profile element 36 reinforces a central tunnel 35 of the vehicle.

What is claimed is:

1. A front-section structure of a motor vehicle, having two longitudinal beams connected to a vehicle body, the front-section structure comprising:

suspension unit mounts held on each of the longitudinal beams;

a transverse beam connected to front ends of the longitudinal beams, the transverse beam being above the longitudinal beams; and lattice girders extending in a longitudinal direction of the longitudinal beams, a first end of each of the lattice girders being connected to the transverse beam and a second end of each of the lattice girders being connected to a suspension unit mount.

2. The front-section structure of claim 1, wherein the transverse beam has a transverse bar and two transverse struts arranged below the transverse bar, the transverse struts extending at an angle from a vehicle longitudinal central axis to the longitudinal beams and being connected respectively to vertical pillars extending between the longitudinal beams and the transverse bar.

3. The front-section structure of claim 1, wherein the lattice girders are arranged and connected in an approximately horizontal plane and extend obliquely between a bracket of the suspension unit mount and the transverse beam.

4. The front-section structure of claim 3, wherein each of the lattice girders comprises two outer struts that diverge toward the bracket of the suspension unit mount and inner struts that are inclined at an angle with respect to the outer struts.

5. The front-section structure of claim 4, wherein the inner struts include an end-side inner strut that runs from the outer strut of the respective lattice girder to the transverse beam and is connected to the transverse beam.

6. The front-section structure of claim 4, wherein the outer strut has an end directly to the transverse beam.

7. The front-section structure of claim 1, wherein each of the suspension unit mounts comprises a bracket with rear and front vertical support arms, the suspension unit mount being arranged in a support plate between the support arms, and the front support arm being connected to the respective lattice girder.

8. The front-section structure of claim 7, further comprising support rods connected respectively to the support plates of the suspension unit mounts, each of the the support rods being inclined at an angle to the longitudinal central axis and having an end fastened to a cowl frame reinforcement, at least two parallel transverse beams arranged between the support rods and being connected to interposed struts.

9. The front-section structure of claim 7, further comprising suspension dome braces of lattice form connected to the support plate by a circular plate, and having an opposite end on the vehicle body.

10. The front-section structure of claim 1, wherein the longitudinal beam has a fork at a rear end as viewed in the direction of travel, an upper portion of the fork being connected to a bulkhead of the vehicle and a lower portion of the fork being connected to an underfloor of the vehicle body.

* * * * *